Nov. 26, 1946.  J. U. GARIBAY  2,411,652
WELDING TOOL
Filed June 11, 1945
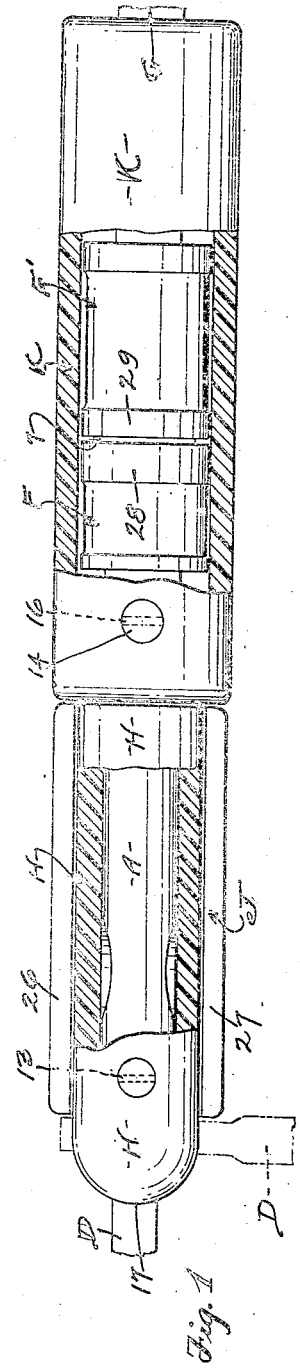
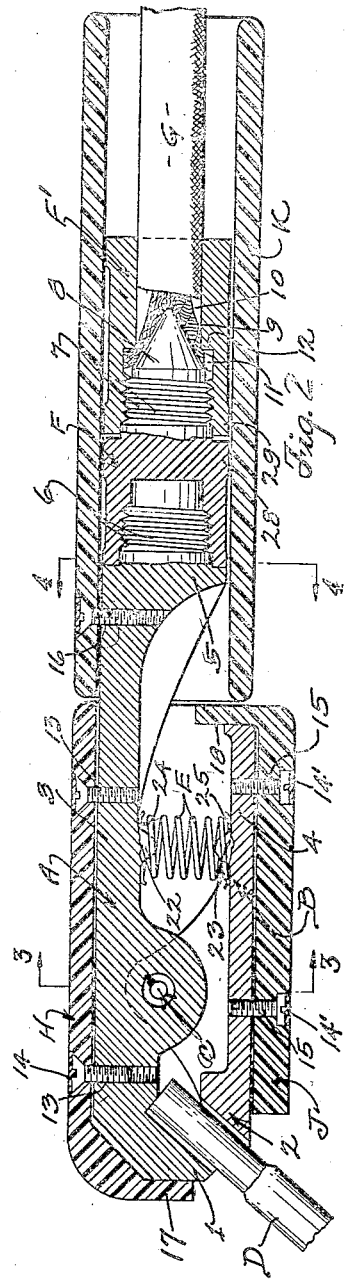
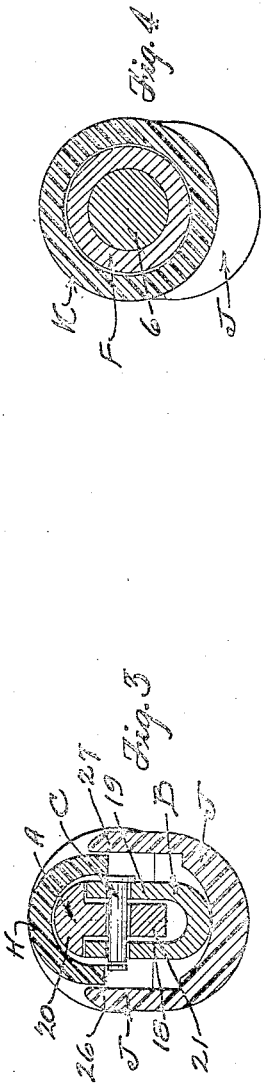
JOSEPH U. GARIBAY
INVENTOR.
BY
ATTORNEY Patented Nov. 26, 1946

2,411,652

UNITED STATES PATENT OFFICE 2,411,652

WELDING TOOL

Joseph U. Garibay, Montebello, Calif.

Application June 11, 1945, Serial No. 598,683

2 Claims. (Cl. 219—8)

This invention relates to welding tools for a purpose similar to that disclosed in my pending application for patent filed October 25, 1943, Serial No. 507,572 and with respect to which this application is a continuation in part.

An object is to provide a streamlined welding tool which is not only comfortable when held by a welder, but which is completely insulated against contact with the live elements of the tool; is quickly assembled and disassembled for effecting replacement of parts; is provided with steadfast gripping jaws for operatively supporting a rod of welding material, and is generally arranged to provide a more efficient welding tool than those now in use.

A particular object of the present invention is to provide an improved means for connecting a cable to the electrodes which eleminates soldering of the cable leads to the electrode holder.

An important object is to provide a tool which includes a pair of spring tensioned jaws disposed at an appropriate and convenient angle relative to the axis of the body for operatively supporting a welding rod, separable insulating sleeves or shields affixed to the metallic parts of the tool, and quickly disassemblable connectors for detachably connecting an electric cable to one of the tensioned rod supporting members. Still other objects will appear as the description of my improvement progresses.

I have shown a preferred form of invention in the accompanying drawing, subject to modification, within the scope of the appended claims, without departing from the spirit of the invention.

In said drawing:

Fig. 1 is a top plan view, partly in section;

Fig. 2 is a sectional elevation;

Fig. 3 is a transverse section on line 3—3; and

Fig. 4 is a transverse section on line 4—4 of Fig. 2.

Briefly described, a welding tool constructed in accordance with my invention includes a pair of metallic members A and B hinged together at C with jaws 1 and 2 formed thereon forwardly of the hinge C and adapted to grip and hold a welding rod D. Said jaws are urged into gripping relation with rod D by means of a compression spring E which is positioned rearwardly of hinge C between longitudinal extensions 3 and 4 of members A and B, respectively. Portion 3 of member A has a circular rear end portion 5 formed with a rearwardly extending and reduced threaded attaching portion 6 adapted to receive an internally formed and threaded connector F.

Member F is of circular cross section and is formed with an externally threaded portion 7 having a terminally positioned conical contact element 8 integral therewith and adapted to be embedded in the strands 9 of a conductor cable G which leads from a suitable source of electric current. A second connector F' of annular cross section is provided with a central bore 10 so formed that it may be slidably held on the cable G, a counterbore 11 forwardly of bore 10 providing an internal shoulder 12 and which is internally threaded to receive the externally threaded portion 7 of member F.

Thus, in attaching the cable G to electrode A the connector F' is first attached to the end of the cable by spreading the strands 9 of the cable outwardly, as shown in Fig. 2 so that the ends thereof will overlie shoulder 12, whereupon the connector F' is screwed onto connector F until the conical attaching portion 8 is firmly embedded in the mass of strands 9, thereby insuring a perfect electrical connection between the cable G and member A.

Member A has an insulating shield of arcuate cross section as at H attached thereto as by means of screws 13 the heads of which are covered by a suitable plastic insulation as at 14. Likewise, member B has a shield J of insulating material underlying it and attached thereto as by means of screws 15, the heads of which are also covered by plastic insulation as at 14'. Portion 5 of member A has a shield of cylindrical cross section as at K attached thereto by means of screws 16 with their heads covered by similar insulation material, and member K is extended rearwardly for a suitable distance to provide a handle for the tool and also for the purpose of enclosing connectors F and F' and the end of cable G. The rear ends of shields H and J and the forward end of shield K are as close together as expedient so as to afford no opportunity for an operator making contact with members A, B, F or F'.

Jaws 1 and 2 of members A and B, respectively, are disposed at corresponding angles of approximately 45 degrees from the longitudinal axis of the tool and the shield H has an end portion 17 which is bent downwardly over the angular jaw 1; also shield J has a rear end portion extended upwardly at the rear of member B so that when shield K is removed it will protect the welder against contact with portion 4 of member B.

Member B is of U-shaped cross section as shown in Fig. 3 with legs or sides 18 and 19, while member A has an upper portion 20 in the form of a segment of a circle and a lug 21 which depends into the space between portions 18 and 19 of member B. A hinge pin C extends through portions 18 and 19 of member B and portion 21 of member A for pivotally supporting the members A and B together. Members A and B have corresponding lugs 22 and 23 on their inner surfaces rearwardly of the hinge C, which carry washers 24 and 25, respectively, between which the spring E is confined when the tool is assembled for use.

It will be noted by reference to Fig. 3 that shield J has upwardly extended side portions 26 and 27 which overlie the lower edges of shield H so that when the tool is gripped in the hand of an operator there can be no possibility of making contact with either the member A or B.

It may be noted that as shown in Fig. 1 the welding rod D may be turned at right angles to the position shown in full lines to a position shown in broken lines for rendering the tool adaptable to welding operations which would not be possible or convenient when extended longitudinally.

In operation, the tool is gripped at the handle K at a point near the rear end of shields H and J. The jaws 1 and 2 are opened by applying pressure to the lower side and rear portion of shield J and a section of welding rod D is inserted between the jaws as shown in Fig. 2, assuming that a cable G has been electrically connected with the connectors F and F' and member A. Otherwise, the sleeve K is removed from the tool by detaching screws 16, the connector F'' is removed from the connector F and applied to the end of cable G and retracted to an extent necessary to spread the strands 9 of the cable, after which the connector F' is threaded onto the rear end of connector F until the conical contact 8 is deeply embedded in the mass of strands and the then spread ends of the cable strands overlie shoulder 12, as shown in Fig. 2. Of course it will be apparent that the tighter the connector F' is screwed upon the connector F the better the contact will be between portion 8 of the member F and cable G.

The detachment of the cable from the tool requires only the initial removal of the sleeve K from the tool and the detachment of connector F' from connector F. In no case is soldering of the cable connection with member A necessary or desirable. Portions 28 and 29 of connectors F and F', respectively, may be externally knurled so as to eliminate the necessity for the use of wrenches for detaching the cable from the tool. No loose cable connections occur when the cable is detached from the tool and the tool can be inspected and corrected for imperfections at the end of a shift without incurring jeopardy of workers, and will also prevent unnecessary interruptions.

An important feature of my new tool is the provision of a streamlined body composed of a pair of hinged members having mating jaws for gripping a welding rod, and extensions oppositely extended from the axis of these hinged members, one of which extensions supports a handle, and a plurality of insulating shields carried by said hinged members for completely covering the metallic portions of said members, and thereby insuring protection for an operator when using the tool. By reason of the particular form and arrangement of the insulating shields it is impossible for an operator to contact any live portions of the tool accidentally. Moreover, the form of the hinging jaw members is such that when a welding rod is gripped between the jaws of said members the extensions of said members will be substantially parallel with the handle.

From the foregoing description and by reference to the drawing it will be apparent that I have provided a streamlined, safe, comfortable, convenient, economical and efficient welding tool of relatively light weight, as compared with other tools for the same purpose (approximately 17 ounces) with a maximum amperage (approximately 400 amperes), which is capable of handling welding rods of variable diameter (from one-sixteenth to fixe-sixteenths of an inch). However, I do not limit myself to the hereinabove named weight, capacity or degree of use, for it will be apparent that I may adapt my structure to various sizes and uses without changing the principle herein disclosed.

I claim:

1. A welding tool comprising: a pair of hinged members having cooperating jaws and tensioned for gripping and supporting a welding rod, and so arranged that when supporting a welding rod said members will be substantially parallel, one of said members having a handle extension, and separate insulating shields attached to said members for protecting an operator against contact with the jaw members, one of said shields being of cylindrical cross section and adapted to encompass said handle extension and a cable electrically connected therewith, and a pair of said shields being of U cross section of different size and arranged in overlapping relation and attached to the jaw members forwardly of the cylindrical shield.

2. A welding tool comprising: a pair of hinged members having cooperating jaws and tensioned for gripping and supporting a welding rod, and so arranged that when supporting a welding rod said members will be substantially parallel, one of said members having a handle extension, and separate insulating shields attached to said members for protecting an operator against contact with the jaw members, one of said shields being of cylindrical cross section and adapted to encompass said handle extension and a cable electrically connected therewith, and a pair of said shields being of U cross section of different size and arranged in overlapping relation and attached to the jaw members forwardly of the cylindrical shield, said pair of shields having portions overlying opposite ends of the jaw members to which they are respectively attached.

JOSEPH U. GARIBAY.